United States Patent Office 3,159,288
Patented Dec. 1, 1964

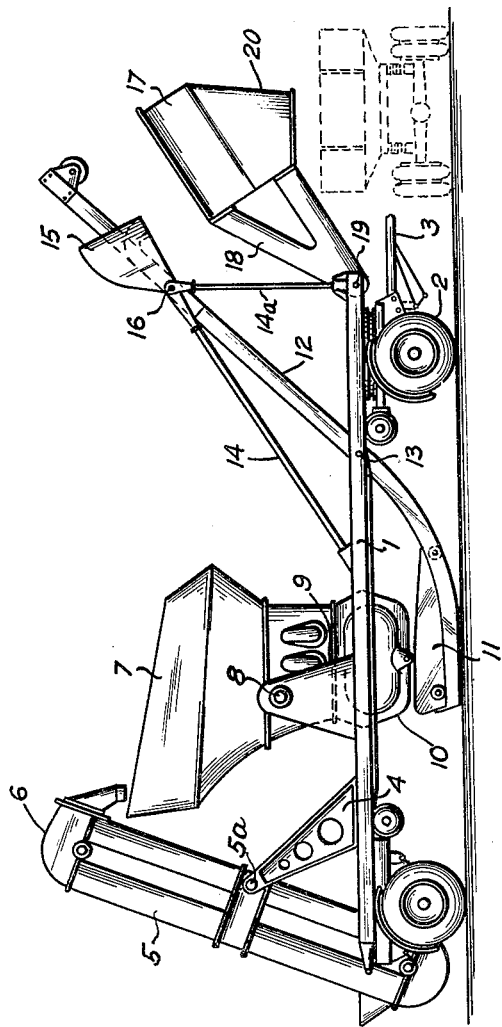

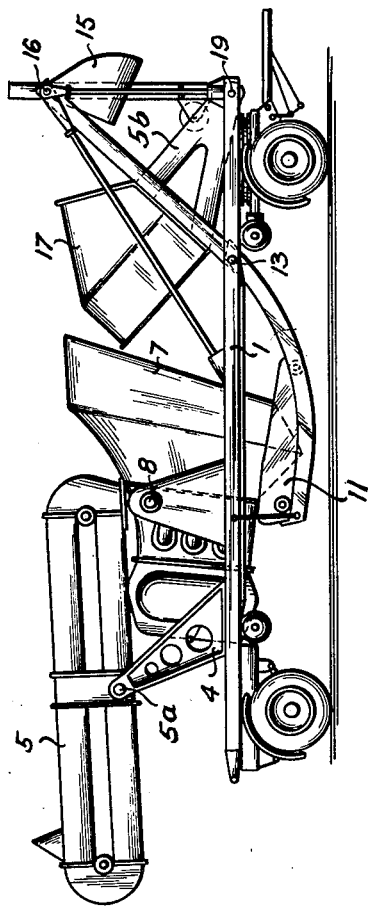

3,159,288
APPARATUS FOR THE PREPARATION AND LOADING OF BITUMINOUS ROAD-BUILDING MATERIAL
Carl-Hermann Heise, 12 Kalandstrasse, Alfeld (Leine), Germany
Filed Feb. 12, 1962, Ser. No. 172,608
Claims priority, application Germany Nov. 27, 1961
2 Claims. (Cl. 214—17)

The present invention relates to an apparatus for the preparation and loading of bituminous road-building material which apparatus is transportable by road or by rail, more particularly, to that type of apparatus which comprises a hot bucket conveyor which conveys into a mixing tower and a loading bucket which takes mixed material from the mixing tower and loads it into a hopper with all of these components being mounted on the frame of the apparatus.

The present trend is to construct various types of road-building equipment so as to have ever increasing outputs in order to keep up with the increasing pace at which roads are being built. In order to increase the output capacities of such machines, the sizes of the machines have been so increased that the dimensions thereof exceed the specified limits for transportation of these machines by rail and by road. Accordingly, various types of machines have been so constructed so that their overall dimensions during transportation are considerably less than the overall dimensions of the apparatus in its operating position. In this manner these machines can be transported along roads and by railroads.

In one such machine the mixing tower was constructed in several parts so that the lower part was fixedly mounted on the frame but the upper part was pivotally connected thereto by a horizontal axis. In addition, the hot bucket conveyor was pivotally mounted on the frame and was provided with wheels so as to trail behind the machine when the machine was transported. The loading bucket conveyor was mounted on the frame and was provided either with pivoting or telescoping portions so as to occupy less space when pivoted to the transporting positions.

Another proposed road-building machine comprised a pivotal mounting on the machine frame for the upper part of the mixing tower and providing this upper part with a wheel frame so that when the upper part of the mixing tower was pivoted to its transporting position, it would rest upon its wheel frame somewhat like a trailer with respect to the road-building machine. The hot bucket conveyor was also pivotally mounted on the machine frame and swung out in its transported position to rest on the upper part of the mixing tower. Thus, for transport the purposes the road-building machine comprised a trailer which included the upper part of the mixing tower and the hot bucket conveyor.

Another proposal comprised constructing the mixing tower in three parts wherein the lower part remained fixed to the machine frame, the center part was lowered onto the machine frame, and the upper part was pivoted so as to comprise a separate trailer when it was desired to transport the road-building machine.

It is therefore the principal object of the present invention to provide a novel and improved road-building machine wherein the various components thereof can be readily pivoted to transporting positions to enable the machine to travel on both roads and rails.

It is a further object of the present invention to provide a readily transportable road-building machine wherein constructing of the mixing tower into separate parts is avoided.

The road-building machine of the present invention essentially comprises pivotally mounting both the hot bucket conveyer and the mixing tower at their centers of gravity so that both of these components can be readily pivoted into the horizontal transporting positions by using only small force. In addition, the machine comprises a loading bucket which gathers mixed materials from the lower end of the mixing tower and discharges the materials into a hopper which also is pivotally mounted on the frame of the machine. The upper portion of the track of the loading bucket, which includes a loading guide platform for the loading bucket, is pivotally mounted for the transportation position. When all of these components are pivoted from their operating positions into the transporting positions, the overall dimensions of the machine are readily within the dimensional limits for transportation by both road and rail.

Other objects and advantages of this invention will be apparent upon reference to the accompanying description when taken in conjunction with the following drawings, wherein FIGURE 1 is a side elevational view of the road-building machine of the present invention with all of the components in their operating positions; and FIGURE 2 is a view, similar to that of FIGURE 1, but showing all of the components in their transporting positions.

A specific embodiment of the present invention will next be described in detail with reference to the accompanying drawings wherein like reference symbols indicate the same parts throughout the various views.

With particular reference to FIGURE 1, the road-building machine of the present invention comprises an elongated frame 1 mounted on wheels 2 and having a hitching rod 3 for connection to a truck or other vehicle whereby the machine can be towed.

Although the frame is mounted on wheels equipped with rubber tires so that the machine can be transported along roads, other types of wheels can be used, depending upon the manner in which the machine is to be transported.

Adjacent the rear end of the frame there is fixedly mounted an upwardly extending arm 4 upon which a bucket conveyer 5 for hot bituminous materials is pivotally mounted at its center of gravity 5a. The upper end 6 of the bucket conveyer discharges into a mixing tower 7 which is pivotally mounted at its center of gravity 8 on an upstanding support 9. The upper end of the mixing tower 7 is provided with a sifter into which road-building materials are discharged in a known manner from a drying drum.

The lower or discharge end of the mixing tower, indicated at 10, discharges into a loading bucket 11 which is mounted on tracks 12. The tracks 12 are pivotally mounted at 13 on the frame 1. Rods 14 and 14a are employed to stabilize the upper end of the track 12.

A loading guide platform 15 is pivotally mounted at the upper end of the track 12 at the pivot point 16. Positioned beneath the loading guide platform 15 is a hopper 17 which is mounted on the outer ends of supporting arms 18. The rear ends of supporting arms 18 are pivotally connected at 19 to the front end of the frame 1. The lower or discharge end 20 of the hopper 17 then discharges directly into trucks driven thereunder.

The above-described components operate in the conventional manner and the hot bituminous materials are fed into the mixing tower 7 by the bucket conveyer 5. The hot bituminous materials are then mixed with suitable aggregate discharged into the mixing tower from a drying drum. The resulting mixed building material is then discharged into the loading bucket 11 wherein a load is then hauled up the track 12 onto the loading guide platform 15. The mixed material is then dumped into the hopper 17 from where it is selectively discharged into waiting trucks.

In order to transport the machine, the various components are pivoted into the positions as shown in FIGURE 2.

The hot bucket conveyer is pivoted to a substantially horizontal position wherein its upper end 6 rests upon the mixing tower 7 which similarly has been pivoted through an angle of about 90° to a horizontal position. The hopper 17 and its supporting arms 18 are pivoted through an angle of about 120° so that the supporting arms 18 rest upon the frame 1.

The loading guide platform 15 is pivoted through an angle of about 135° into the position as shown in FIGURE 2.

The lower portion of the guide track 12 together with the loading bucket 11 are swung upwardly about the pivot point 13 into the position shown in FIGURE 2.

Since both the bucket conveyer 5 and the mixing tower 7 are pivoted at their centers of gravity, very little force will be required to pivot these components from their operating to their transporting positions. Any suitable device can be used for this purpose.

A suitable elevating mechanism is employed for pivoting the remainder of the components into their transporting positions.

The aggregate from the drying drum may be delivered to the tower 7 through a screw or helical conveyer which forms the pivotal shaft of the tower. This conveyer enters the tower at the center of gravity 8.

It is thus apparent that the overall height of the roadbuilding machine is considerably reduced when the components are pivoted to the transporting position. When in this position, the dimensions of the machine are well within the limits for transportation upon both rails and roads.

It will be understood that this invention is susceptible to modification in order to adapt it to different usages and conditions and, accordingly, it is desired to comprehend such modifications within this invention as may fall within the scope of the appended claims.

What is claimed as this invention is:

1. An apparatus for the preparation and loading of bituminous road building material comprising an elongated frame mounted on front and rear wheels, an upright bucket conveyor pivotally mounted substantially midway its length on the rear end of said frame on a transverse axis and tiltable about said axis into an approximately horizontal position, an upright mixing tower pivotally mounted on a transverse axis on the middle of said frame and normally in position to receive material from the upper end of said conveyor but tiltable about its axis into an approximately horizontal position with the normally upper end of the conveyor overlying and resting upon the normally lower portion of the mixing tower, a hopper pivotally mounted on the front end of said frame on a transverse axis, a second bucket conveyor pivoted on said frame and having one end extending beneath said mixing tower and the other end thereof extending about said hopper, and said hopper being normally in position to receive material from said second bucket conveyor but tiltable rearwardly about its transverse axis into an approximately horizontal position to rest on said frame adjacent said tilted mixing tower.

2. The invention as defined in claim 1, wherein said mixing tower is swung on its pivot approximately 90° forwardly and said hopper is swung on its pivot approximately 120° rearwardly.

References Cited in the file of this patent

UNITED STATES PATENTS

| | | |
|---|---|---|
| 797,356 | Hetherington | Aug. 15, 1905 |
| 2,112,326 | Berner | Mar. 29, 1938 |
| 2,310,592 | Noble | Feb. 9, 1943 |
| 2,493,898 | Pollitz | Jan. 10, 1950 |